June 12, 1956     B. J. SHERWOOD     2,750,346

CATALYTIC SCREEN

Filed Feb. 24, 1953

*INVENTOR.*
BERT J. SHERWOOD
BY William R. Lane
ATTORNEY

United States Patent Office 2,750,346
Patented June 12, 1956

2,750,346
CATALYTIC SCREEN

Bert J. Sherwood, Lakewood, Calif., assignor to North American Aviation, Inc.

Application February 24, 1953, Serial No. 338,246

4 Claims. (Cl. 252—438)

This invention pertains to a screen catalytic material, and more particularly to a screen catalytic material for decomposing hydrogen peroxide.

In the past, it has been customary to use cobalt screens as catalysts to decompose hydrogen peroxide. Cobalt is a relatively scarce material. This invention contemplates a screen which is a catalyst made from abundant nonstrategic materials. The catalyst screen contemplated by this invention decomposes hydrogen peroxide at a rate comparable to the most efficient catalysts presently available. This invention also contemplates a process for creating the screen of this invention.

It is therefore an object of this invention to provide a catalytic screen.

It is another object of this invention to provide a catalytic screen for decomposing hydrogen peroxide.

It is another object of this invention to provide a process for fabricating a catalytic screen.

It is another object of this invention to provide a process for decomposing hydrogen peroxide into steam.

Figure 1:
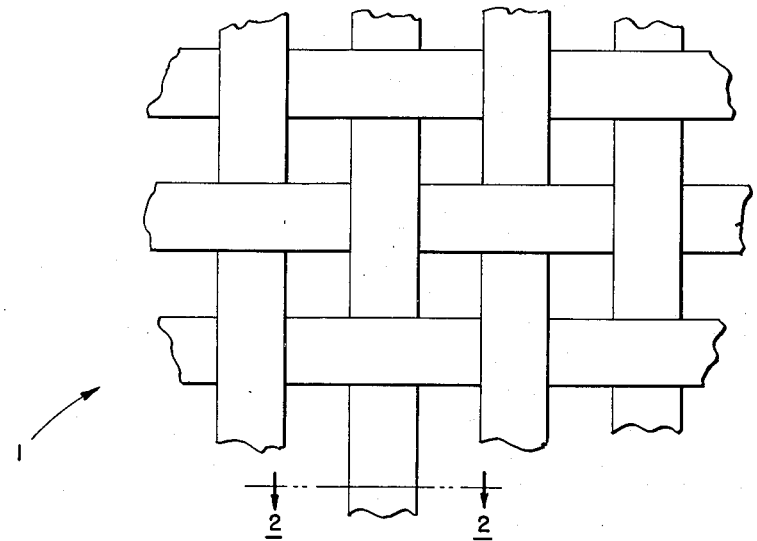
Figure 2:
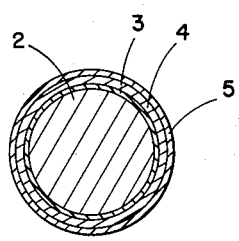

Other objects of invention will become apparent from the following description taken in connection with the accompanying drawings, in which:

Fig. 1 is a view of a screen;

And Fig. 2 is a section view of one wire of the screen taken at 2—2 in Fig. 1.

In Fig. 2, a cross section of one wire of screen 1 is shown. Metal 2 is of steel. Layer 3 is a thin layer of copper plated upon steel 2. Layer 4 is a layer of iron plated upon copper 3. Layer 5 is a layer formed by dipping the iron-plated screen into a mixture of silver nitrate and nitric acid. Layer 5 is the active layer of screen 1 and includes products of chemical combination between the iron of layer 4 and the mixture of silver nitrate and nitric acid.

The catalyst screen prepared by the process of this invention is used to generate steam from hydrogen peroxide. In the steam generation process, screen 1 is placed in a position where hydrogen peroxide impinges upon the surface thereof. The hydrogen peroxide is decomposed to form water and to generate heat to change said water into steam.

To prepare catalytic screen 1 of this invention, for example, first a galvanized steel 14 x 18 mesh having 0.030 inch diameter wire is stripped of its zinc coating by immersing it for from 5 to 30 minutes in a 10% by weight solution of sodium hydroxide maintained within the temperature range of 190° to 200° F. This is continued only until all zinc is removed, leaving only steel wire 2. Next, screen 1 is dipped in sulfuric acid. A nongalvanized steel screen can be used provided all oxides are removed. Next, a thin coating, for example, approximately 0.003 inch thick, of copper 3 is plated thereon using, for example, the following solution and operating conditions:

| Solution Constituent and Operating Range | Concentration |
|---|---|
| Cuprous cyanide | 30 gms./liter. |
| Sodium cyanide | 45 gms./liter. |
| Copper (as metal) | 3.5–4.5 gms./liter. |
| Free Sodium cyanide | 1.8–2.2 oz./gal. |
| Sodium carbonate | 3.3–3.9 oz./gal. |
| Anodes | Electrolytic copper. |
| Current density | 20–30 amps./sq. ft. |
| Plating time | 5–15 minutes. |

Next, screen 1 is immersed into an iron electroplating solution containing, for example, 175 grams per liter of ferrous ammonium sulphate in water. The pH of the solution is, for example, within the range of 5.8 to 6.6. The temperature of the solution is, for example, from 20° to 26° C. The potential between the anode and cathode is, for example, 2.6 volts. The plating time is approximately from two to two and one-half hours. The distance between the anode and cathode is from 2 to 4 inches. The current density is approximately 20 amperes per square foot. The anodes are preferably of pure iron but may be of low carbon steel. After screen 1 is plated with iron 4, it is rinsed, drained and dried. Plated screen 1 is next given a 4 second dip in a solution of, for example, 12 grams per liter of silver nitrate and 28 grams per liter of nitric acid to form activated layer 5. Next, screen 1 is drained and dried without rinsing. Catalytic screen 1 is now ready for use.

Thus, it may be seen that a catalyst screen which utilizes plentiful iron materials has been provided and a process for fabricating the catalyst screen has been provided. The catalyst provided by this invention is very efficient for decomposing hydrogen peroxide, being equal to the most efficient catalysts heretofore known.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A catalytic screen comprising a grid of steel wire, said grid being electroplated with a thin layer of copper, said copper being electroplated with a layer of iron, and said iron being covered with a thin layer formed by dipping the iron-plated wire in a mixed silver nitrate and nitric acid solution for a short interval of time.

2. A catalyst structure comprising a base material of steel, copper electroplated upon said steel, a thin layer of iron electroplated upon said copper, and a layer, formed by dipping for a short interval of time the iron-plated wire in a mixed silver nitrate and nitric acid solution, on top of said iron.

3. A process for fabricating a catalytic screen comprising immersing a galvanized steel screen into a solution of sodium hydroxide to remove all of the zinc from said screen, dipping said screen in a solution of sulphuric acid, electroplating said screen with a thin plate of copper, electroplating said copper covered screen with a thin layer of iron, rinsing said iron covered screen, draining said screen, drying said screen, dipping said screen into a solution of silver nitrate and nitric acid for a short interval of time to partially react with the iron, then draining and drying said screen.

4. A process for fabricating a catalytic screen comprising cleaning a steel screen, electroplating said screen with a thin plate of copper, electroplating said copper-covered screen with a thin layer of iron, and dipping said iron-plated screen into a solution of silver nitrate and nitric acid for a short interval of time to form an exterior activated layer including the reaction products of the silver nitrate, the nitric acid and the iron plating.

References Cited in the file of this patent

UNITED STATES PATENTS

| | | |
|---|---|---|
| 1,043,580 | Eldred | Nov. 5, 1912 |
| 1,907,710 | Bass | May 9, 1933 |
| 2,330,539 | Auchter | Sept. 28, 1943 |
| 2,453,668 | Marisic et al. | Nov. 9, 1948 |
| 2,465,773 | Wernlund | Mar. 29, 1949 |

OTHER REFERENCES

Treatise on Chemistry, Roscoe and Schorlemmer, vol. 1, pages 340 and 341, 1920.